(12) United States Patent
Lindskog et al.

(10) Patent No.: US 9,282,235 B2
(45) Date of Patent: Mar. 8, 2016

(54) FOCUS SCORE IMPROVEMENT BY NOISE CORRECTION

(71) Applicant: Apple Inc., Cupertino, CA (US)

(72) Inventors: Alexander Lindskog, Santa Clara, CA (US); Ralph Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 14/292,789

(22) Filed: May 30, 2014

(65) Prior Publication Data

US 2015/0350522 A1 Dec. 3, 2015

(51) Int. Cl.
H04N 5/232 (2006.01)
G03B 13/36 (2006.01)
H04N 5/357 (2011.01)

(52) U.S. Cl.
CPC ............ H04N 5/23212 (2013.01); G03B 13/36 (2013.01); H04N 5/23293 (2013.01); H04N 5/357 (2013.01)

(58) Field of Classification Search
CPC .......... G03B 3/00; G03B 21/53; G03B 13/00; G03B 13/32; G03B 13/34; G03B 13/36; G02B 7/09; G02B 7/28; G02B 7/36; H04N 5/23212; H04N 5/357; H04N 5/23293; G06T 5/003; G06T 5/004; G06T 2207/10148
See application file for complete search history.

(56) References Cited

U.S. PATENT DOCUMENTS

| 7,929,044 | B2 | 4/2011 | Chen | |
|---|---|---|---|---|
| 2010/0309335 | A1* | 12/2010 | Brunner | H04N 5/144 348/231.6 |
| 2010/0309364 | A1* | 12/2010 | Brunner | H04N 5/23212 348/345 |
| 2012/0070097 | A1* | 3/2012 | Adams, Jr. | H04N 5/23212 382/255 |
| 2012/0307096 | A1* | 12/2012 | Ford | H04N 5/23219 348/222.1 |
| 2013/0188086 | A1 | 7/2013 | Fujiki | |
| 2013/0342750 | A1 | 12/2013 | Foote | |
| 2014/0009636 | A1 | 1/2014 | Lee | |
| 2014/0086486 | A1* | 3/2014 | Pillman | G06T 5/003 382/173 |
| 2014/0233853 | A1* | 8/2014 | Fransson | G06K 9/60 382/173 |
| 2015/0286897 | A1* | 10/2015 | Spaith | G06F 17/3028 382/224 |

* cited by examiner

Primary Examiner — Aung S Moe
(74) Attorney, Agent, or Firm — Blank Rome LLP

(57) ABSTRACT

A method to correct an autofocus operation of a digital image capture device based on an empirical evaluation of image capture metadata is disclosed. The method includes capturing an image of a scene (the image including one or more autofocus windows), obtaining an initial focus score for at least one of the image's one or more autofocus windows, obtaining image capture metadata for at least one of the one or more autofocus windows, determining a focus adjustment score for the one autofocus window based on a combination of the autofocus window's image capture metadata (wherein the focus adjustment score is indicative of the autofocus window's noise), and determining a corrected focus score for the one autofocus window based on the initial focus score and the focus adjustment score.

20 Claims, 8 Drawing Sheets

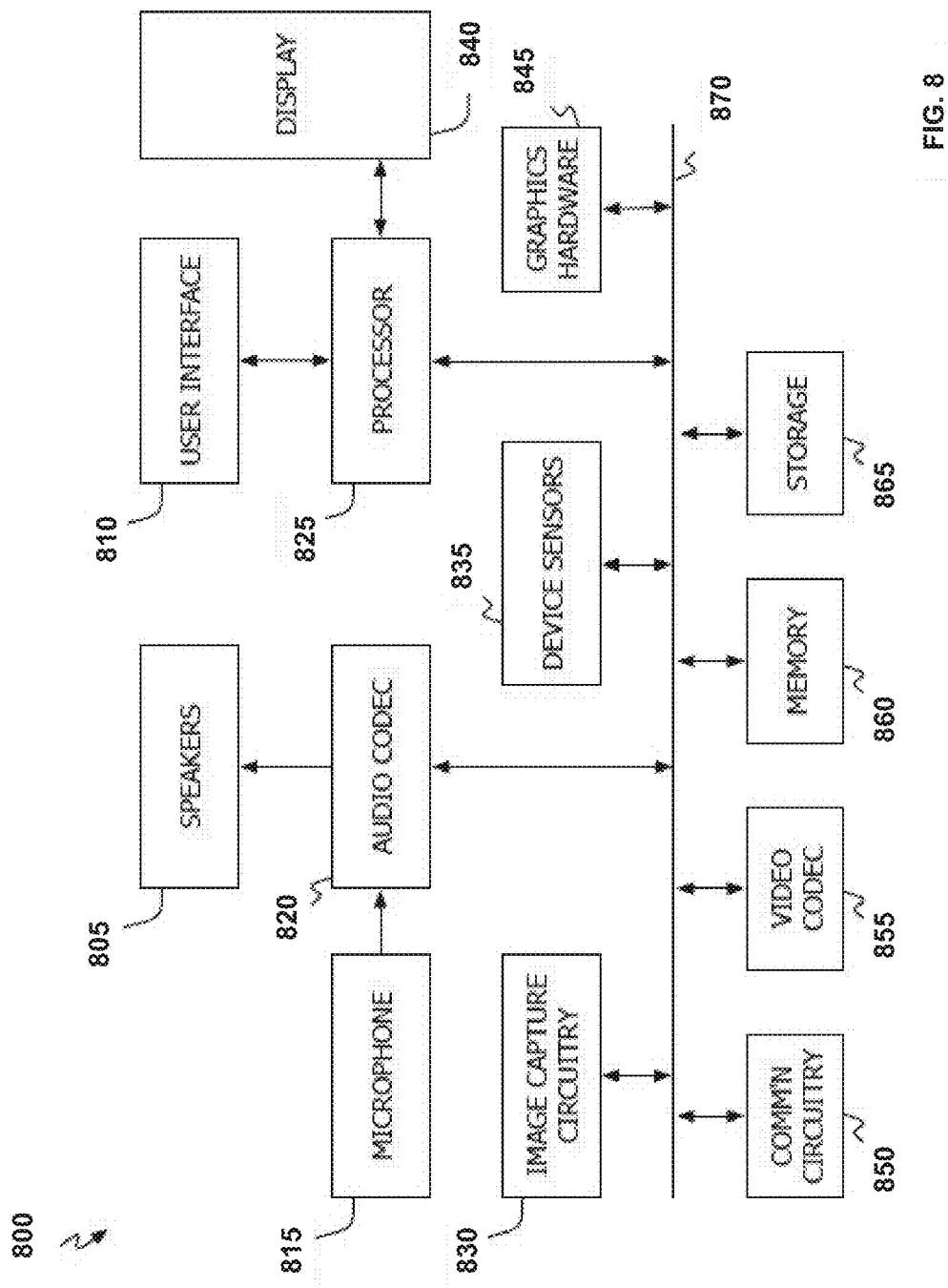

FOCUS SCORE IMPROVEMENT BY NOISE CORRECTION

BACKGROUND

This disclosure relates generally to the field of digital image capture operations. More particularly, but not by way of limitation, it relates to techniques for focus score improvement by noise cancellation in a digital camera.

A camera's autofocus system automatically adjusts the camera lens' position to obtain focus on a subject. As used in this disclosure, the term "camera" refers to any device having digital image capture capability. Examples include, but are not limited to, digital SLR cameras, point-and-shoot digital cameras, mobile phones, laptop or notebook computer systems, tablet computer systems, personal digital assistants, and portable music/video players.

Autofocus systems may generally be divided into two types: active, and passive. Active autofocus systems measure the distance to a subject by emitting, and using, a signal to estimate the distance to the subject (e.g., ultrasound and infrared). The estimated distance is then used to adjust or set the camera's focal length (i.e. lens position). In contrast, passive autofocus systems set a camera's focal length or lens position by analyzing an image captured by the camera's optical system. Passive autofocusing can be achieved through phase detection or contrast measurement.

Many small multifunction devices such as mobile phones use a passive autofocus technique based on contrast measurement. In devices such as these, autofocus operations involve adjusting the position of the device's lens at a specified number of locations and evaluating the focus (e.g., contrast) between corresponding areas in successive images. That lens position is given a focus score, corresponding to the maximum contrast, as determined by the number of sharp edges detected. The focus score informs the autofocus system if the lens position is the position that has the maximum sharpness.

However, a problem many autofocus systems suffer from is that they may trigger, or fail to trigger, an autofocus operation improperly based on the amount of noise present within the focus score. When this happens, the autofocus system may improperly determine that a camera is out of focus or in focus, and improperly adjust (or fail to adjust) the position of the camera's lens.

SUMMARY

In one embodiment the disclosed concepts provide a method to correct an autofocus operation of a digital image capture device based on an empirical evaluation of the image metadata rather than by taking noise measurements. The method includes capturing an image of a scene (the image including one or more autofocus windows), obtaining an initial focus score for at least one of the image's autofocus windows, and obtaining image capture metadata for the at least one autofocus window. The method further includes determining a focus adjustment score for the autofocus window based on a combination of the autofocus window's image capture metadata (wherein the focus adjustment score is indicative of the autofocus window's noise), and determining a corrected focus score for the autofocus window based on the initial focus score and the focus adjustment score.

In another embodiment, obtaining an initial focus score includes obtaining an initial focus score from an autofocus module. In still another embodiment, image metadata includes one or more of the white balance gain, lens shading correction gain, light level, camera gain, focal length, auto-focus window position, shutter speed, aperture setting, ISO speed, image capture temperature, image capture pressure, type of lens, size of lens, color channel detection type, and exposure setting of the image capture device.

In another embodiment, the method for correcting the autofocus operation of a digital image capture device includes capturing a plurality of additional images of a scene (wherein each additional image is captured at different lens positions), obtaining an initial focus score for each of the additional images (wherein each of the initial focus scores correspond to each additional image's autofocus windows), and obtaining image capture metadata corresponding to each additional initial focus score. The method continues by determining a focus adjustment score for each of the initial focus scores based on a combination of the image capture metadata (wherein each focus adjustment score is indicative of noise associated with a corresponding initial focus score), and determining a corrected focus score for each of the additional images based on each additional image's initial focus score and the corresponding focus adjustment score.

In still another embodiment, the method includes selecting an image capture lens position based on corrected focus scores. In another embodiment however, after determining a corrected focus score for each of the additional images, the method includes determining whether at least one of an additional images' corrected focus scores is out of bounds (see discussion below). In still another embodiment, determining whether an additional image's corrected focus score is out of bounds includes determining whether the additional image's corrected focus score is outside of the additional image's corresponding focus bands. Additionally, the method provides for determining that an additional image's focus score is out of bounds when more than one autofocus window is out of bounds for consecutive captured images.

A computer executable program to implement the method may be stored in any media that is readable and executable by a computer system.

BRIEF DESCRIPTION OF THE DRAWINGS

FIG. 8 shows, in block diagram form, a multi-function electronic device in accordance with one embodiment.

DETAILED DESCRIPTION

This disclosure pertains to systems, methods, and computer readable media to improve autofocus systems in digital image capture devices (e.g., cameras, etc.). In general, techniques are disclosed for improving a camera's autofocus operations. More particularly, techniques disclosed herein predict and cancel the noise within a camera's focus score based on an empirical evaluation of the image capture metadata rather than noise measurements.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter.

Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of, predicting and canceling the amount of noise within a camera's focus score, having the benefit of this disclosure.

Figure 1A:
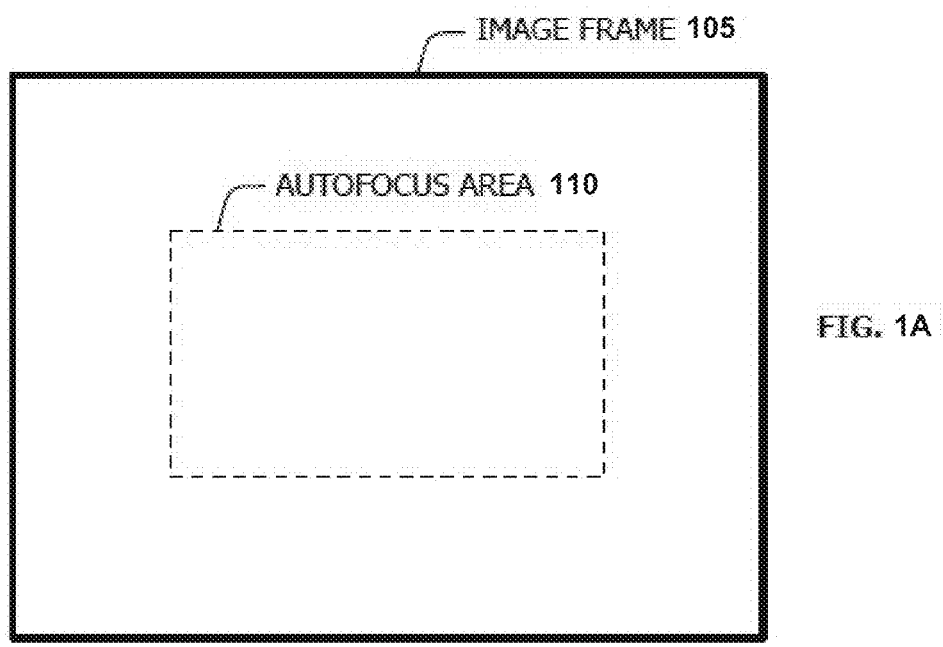
FIG. 1A illustrates an image frame of an image capture device having an autofocus area.

As will be described in detail in this disclosure, an autofocus system takes multiple data samples from different lens positions in a camera in order to determine the best lens position for image capture. As shown in FIG. 1A, and in accordance with the autofocus operation of the camera, an image frame 105 representing image data captured by an image sensor (not shown) is shown, having within it an autofocus area 110. In general, only image data within the autofocus area 110 is considered during an autofocus operation. In one embodiment, the autofocus area 110 may be coincident with the capture frame 105. In another embodiment, autofocus area 105 may be centered in frame 105 as shown. In still another embodiment, the location and/or size of the autofocus area 110 may be moved under user and/or program control. An example of the former can occur when a user touches a camera's touch screen control interface. An example of the latter may occur when a user takes a picture in which the subject is aligned against one side of the frame (e.g., far left or far right) and the rest of the frame is a smooth, uniformly colored, surface. In this situation, control software may move the autofocus area 110 to coincide with the subject.

Figure 1B:
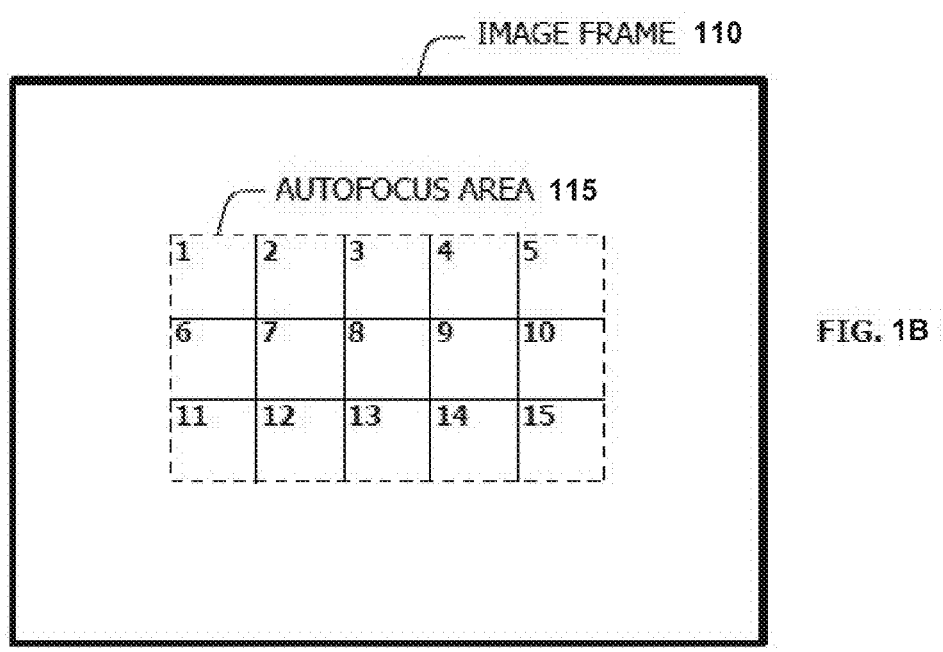
FIG. 1B illustrates an image frame of an image capture device with an autofocus area having multiple windows.

Other embodiments in accordance with an autofocus operation partition the autofocus area 110 into multiple smaller regions (hereinafter referred to as windows). For example, as illustrated in FIG. 1B, the autofocus area 115 may be partitioned into a W×H grid of windows. Referring to FIG. 1B, autofocus area 115 is shown partitioned into a (5×3) grid of windows. The number of windows into which autofocus area 115 may be partitioned may be dependent, at least in part, on the specialized focus metric components used and/or the amount of available memory.

Figure 2A:
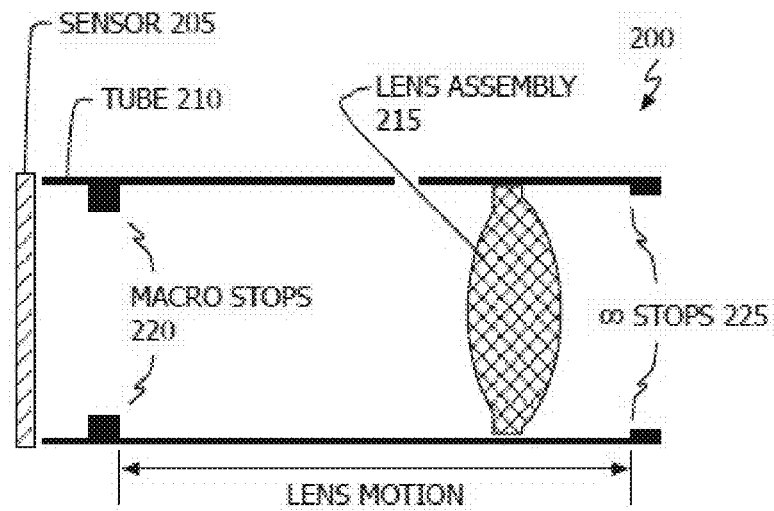
FIGS. 2A-2C illustrate an image capture device assembly in accordance with one embodiment.
Figure 2B:
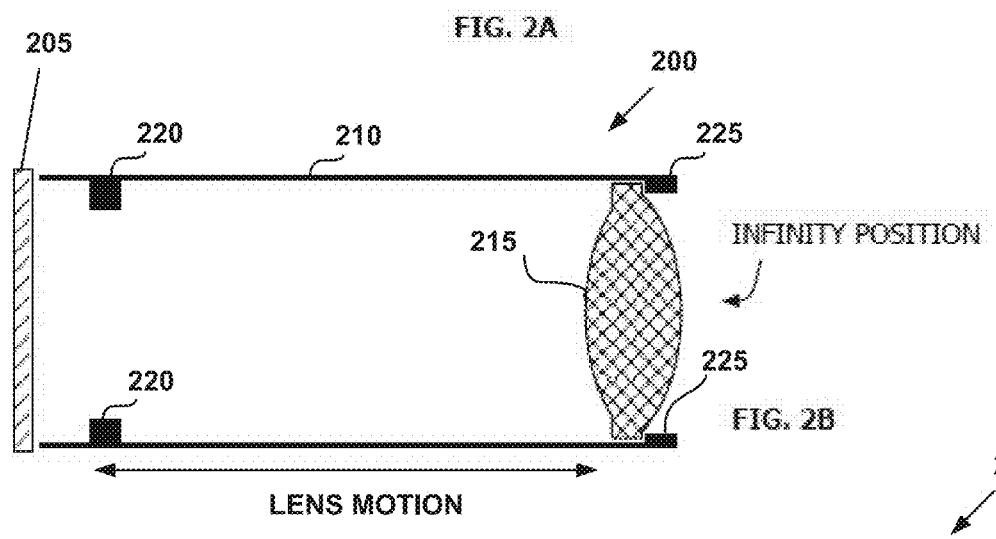

Referring to the components of the autofocus system illustrated in FIG. 2A, the capture assembly 200 may include image sensor 205, lens tube 210, lens assembly 215, macro stops 220, and infinity (∞) stops 225. In this disclosure, the terms "lens" and "lens assembly" are taken to be synonymous. As such, the term lens can mean a single optical element or multiple elements configured into a stack or other arrangement. Referring to FIG. 2B, when lens 215 is against infinity stops 225 all objects beyond a second distance will be in focus (hereinafter referred to as the "infinity distance").

Figure 2C:
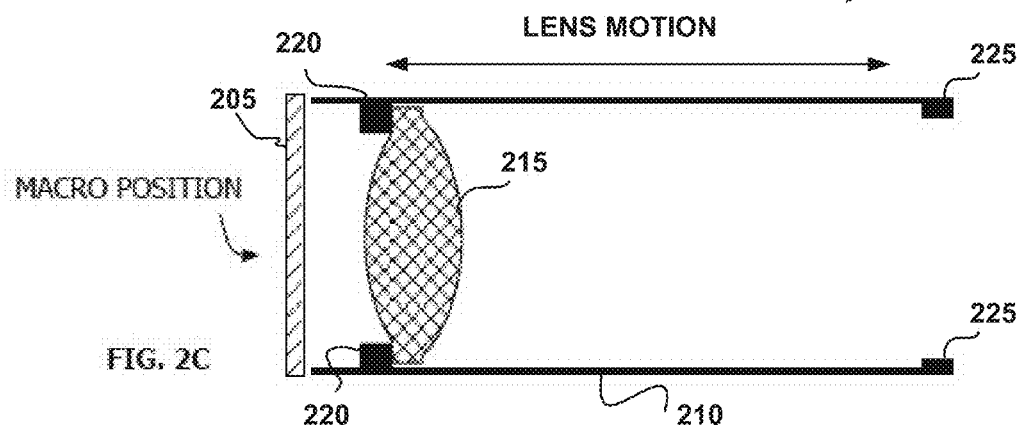

Referring to FIG. 2C, when lens 215 is against macro stops 220 imaging assembly 200 may focus on objects as close as a first distance (hereinafter referred to as the "macro distance"). During autofocus operations, lens 215 may be moved from one end of tube 210 to the other, stopping to capture an image at a specified number of locations in rapid succession along the way. The locations at which lens 215 stops may be uniformly or non-uniformly distributed between the two sets of stops (macro 220 and infinity 225). One of ordinary skill in the art will recognize that a particular camera's macro and infinity distances, as well as the number of lens positions used during autofocus operations, can depend on the camera's specific design. By way of example, some modern mobile telephones have a macro distance of 10-40 centimeters, an infinity distance of 1.5-3 meters, and can, in rapid succession, take between 9 and 15 images—each at a different lens position—during autofocus operations.

Figure 3:
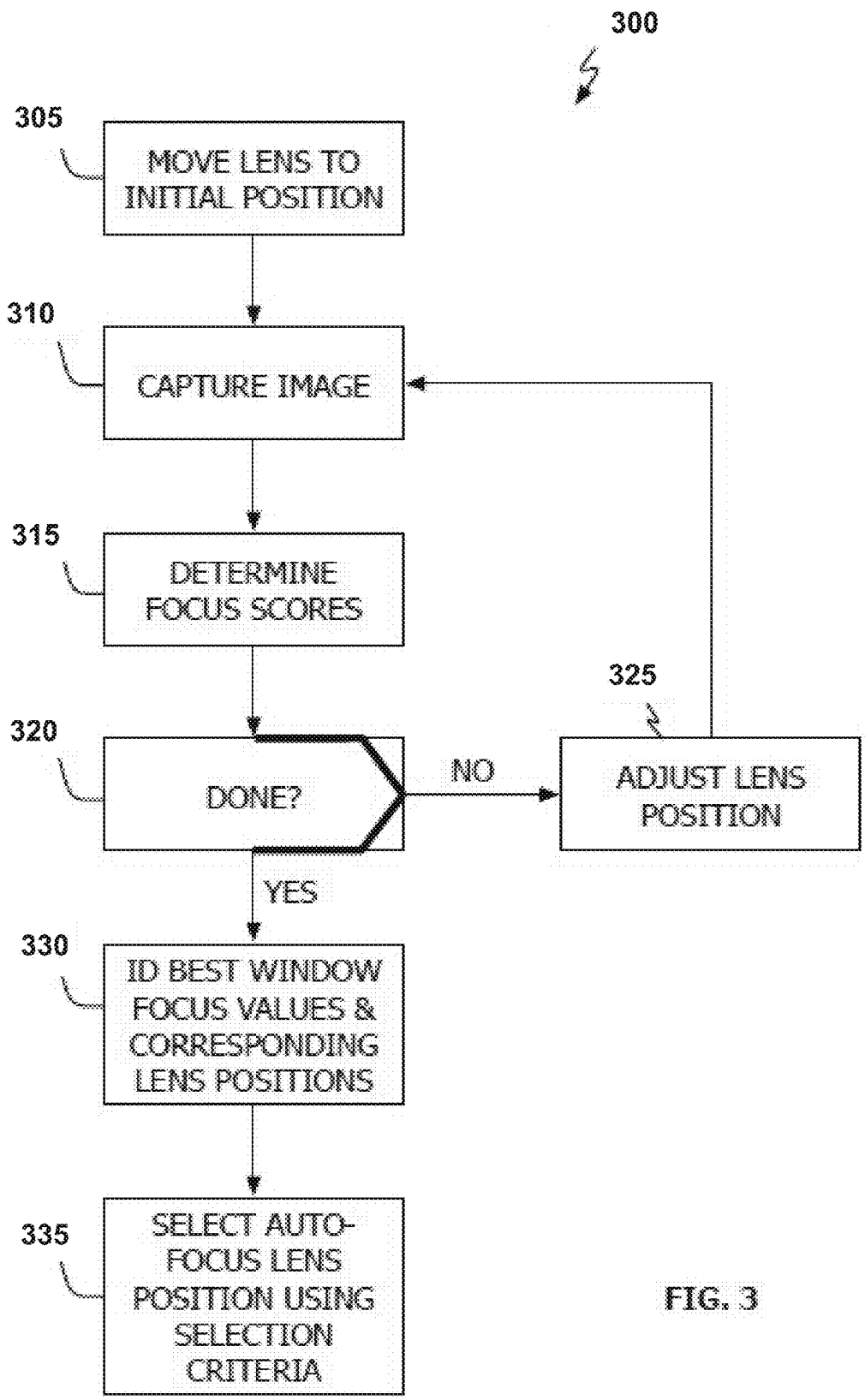
FIG. 3 shows, in block diagram form, an autofocus operation in accordance with one embodiment.

Referring now to FIG. 3, once the lens assembly is moved to an initial position (block 305) and after an image is captured (block 310) and its initial focus scores obtained (block 315), a test may be made to determine if all of the desired or needed images have been acquired (block 320). In one embodiment, an initial focus score may be obtained from an autofocus module used to control the autofocus operation. In this embodiment, the initial focus score may be measured from the captured image. In another embodiment, all or part of the image capture metadata of an image may be used to determine a focus adjustment score to be used during a noise correction operation (as will be described below).

One illustrative autofocus system may be designed (or programmed) to capture one image at each of nine (9) lens' positions while another may be designed (or programmed) to capture one image at each of thirteen (13) lens' positions. If at least one image remains to be captured (the "NO" path through block 320), the position of lens 215 may be adjusted (block 325), whereafter autofocus operation 300 continues at block 310.

Figure 5A:
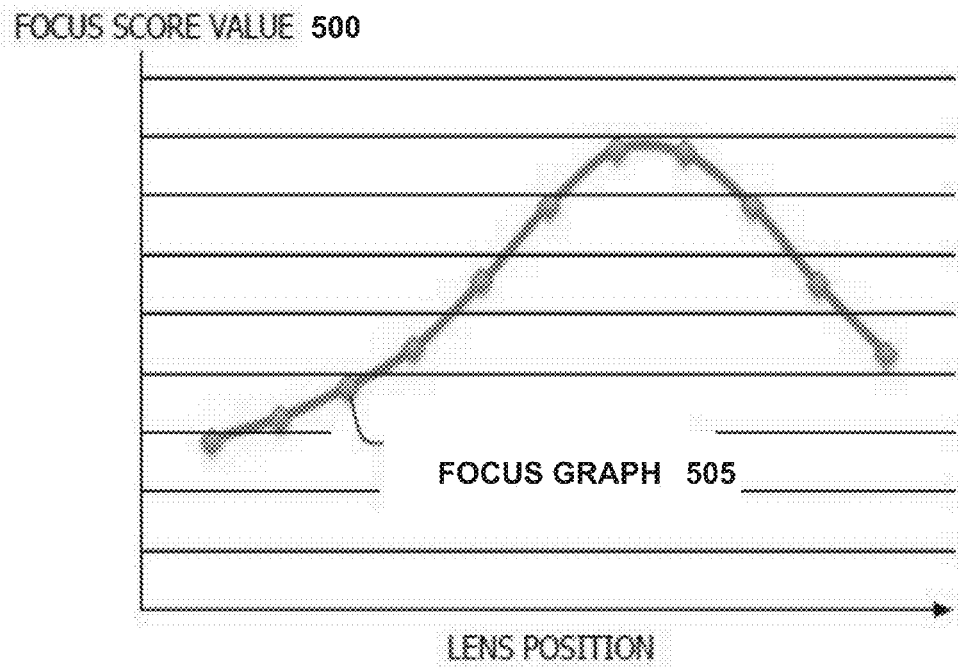
FIG. 5A shows a focus graph in accordance with one embodiment.

Actions in accordance with blocks 305-325 may be known or referred to as the "scan phase" of autofocus operation 300. If all needed images have been captured (the "YES" path through block 320), the best focus score for each window, and their corresponding lens positions, may be identified (block 330). In this embodiment, depending on the function of autofocus operation 300, the best (or maximum) value for a focus score may be measured as either a higher score or lower score. If M represents the number of images captured, and N represents the number of windows in the autofocus area (e.g., autofocus area 115), actions in accordance with blocks 310-325 generate (M×N) focus scores; M focus scores for each of the N windows in the autofocus area. If each of the M focus scores for a single window are plotted against the lens position at which each were determined, the resulting plot is referred to as a focus graph (505). See FIG. 5A.

In one embodiment, the peak of the focus graph (505) indicates the best focus distance for that window. When each of the N groups of M focus scores are evaluated in this way, each window's best focus score—and its corresponding lens position—may be determined (block 330). The lens positions corresponding to the collection of N focus scores determined in accordance with block 330 can be reviewed and, using a selection criteria, the best autofocus lens position chosen (block 335). In one embodiment, the collection of lens positions may be sorted or arranged to facilitate the identification of lens positions at a specified percentile (or equivalent measure) from either the camera's macro position or infinity position. For example, if the selection criteria is the "33$^{rd}$ percentile from the macro position," the autofocus lens position may be set to a distance corresponding to that lens position that is ⅓ the way between the macro distance and the infinity distance in the list of lens positions corresponding to the N focus scores. The same setting would result if the selection criteria were 66$^{th}$ percentile from the infinity position." In another embodiment, autofocus functions in accordance with this disclosure may be extended to incorporate retrigger operations. Once a camera's lens position has been set in accordance with autofocus operation 300, the camera may continue to capture and evaluate images to determine if another autofocus operation should be initiated—and the lens position changed.

Figure 4:
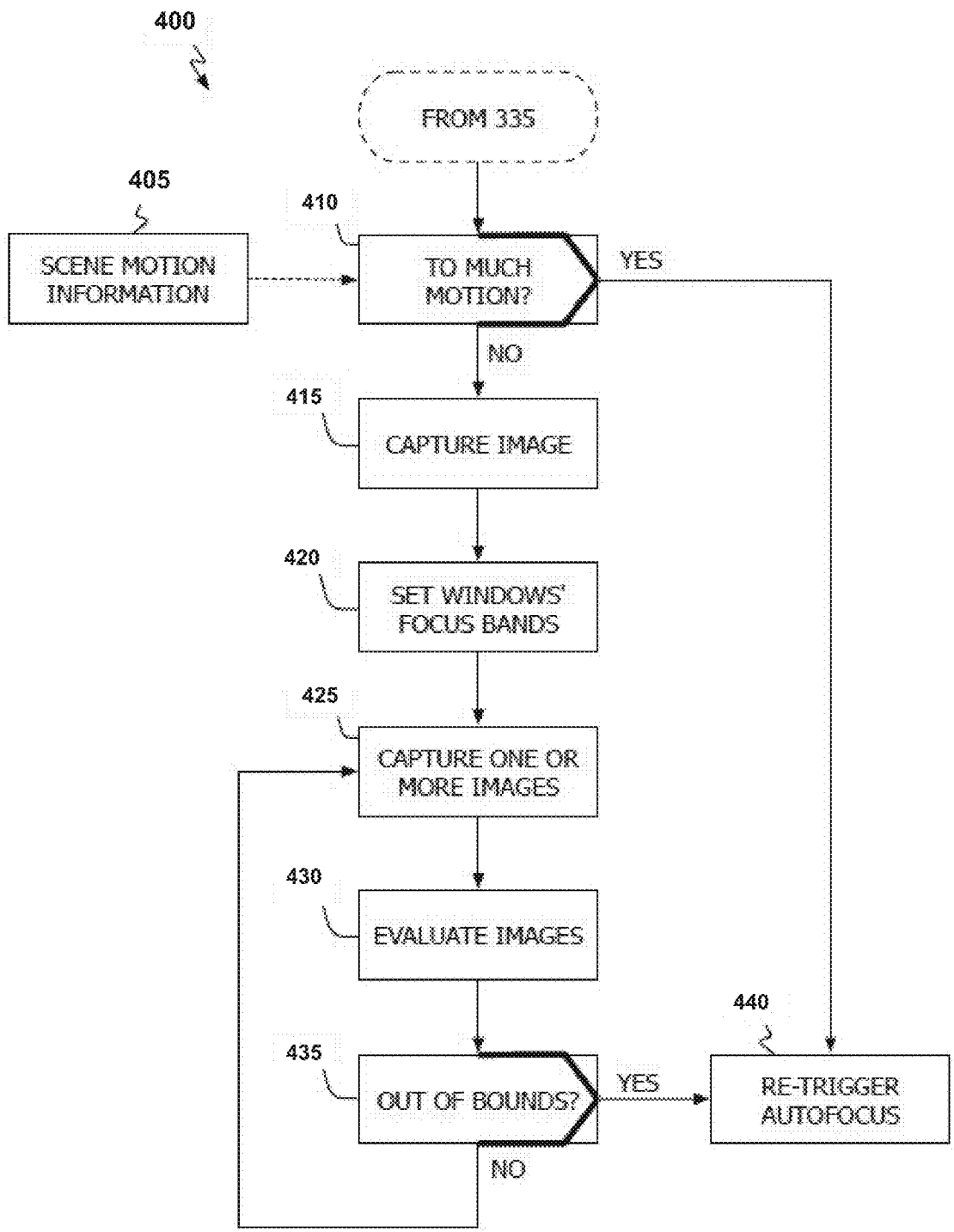
FIG. 4 shows, in block diagram form, and autofocus retrigger operation in accordance with one embodiment.

Referring to FIG. 4, autofocus retrigger operation 400 may begin after a camera's lens position has been set by a prior autofocus operation. An initial check may be made to determine if the camera has been subject to excessive motion (block 410). In one embodiment, motion information 405 may be provided by one or more sensors affixed to, or contained in, the camera. Illustrative sensors include accelerometers and gyroscopes. What constitutes an excessive amount of motion can be set by the designer and may depend upon many factors including the camera's current operational setting. For example, higher shutter speeds are generally less tolerant of motion than are lower shutter speeds. If excessive motion has not been detected (the "NO" path through block 410), an image may be captured (block 415) and its corrected focus scores (described below) used to set each window's focus bands (block 420). Once each window's focus bands have been established, one or more additional images may be captured (block 425) and the resulting focus scores evaluated (block 430). During this evaluation process, when a window's focus score falls outside of the window's focus bands (as described further below), an out of bounds condition may occur and a retrigger operation 400 may be initiated. However, If an out-of-bounds condition is found not to exist (the "NO" path through block 435), retrigger operation 400 continues at block 425. In the present disclosure, references to an autofocus window's focus scores may include corrected focus scores (described below), if the autofocus window's focus scores have been corrected.

In one embodiment, more than a threshold number of windows must be found to be out-of-bounds at the same time before an out-of-bounds condition may be declared. In another embodiment, more than a threshold number of windows must be found to be out-of-bounds at the same time and for at least a minimum number of consecutive images before an out-of-bounds condition may be declared. For example, if more than half the windows are outside their respective bands (i.e., focus bands) for 7 consecutive frames, an out-of-bounds condition may be declared.

In another embodiment, if at least two-thirds of the windows are outside their respective bands for 5 consecutive frames, an out-of-bounds condition may be declared. In still another embodiment, out-of-bounds conditions for normal light surroundings may be different from those used in low-light surroundings. More generally, different bands may be used for different situations (e.g., low light, bright light, sports capture mode, portrait capture mode). If either excessive motion is detected (the "YES" path through block 410) or an out-of-bounds condition is detected (the "YES" path through block 435), a new autofocus operation may be triggered (block 440).

However, based on the amount of noise present within a window's focus score, the autofocus retrigger operation 400 may function improperly. For example, noise may cause windows in the autofocus area to have higher focus scores than they should (i.e., without the noise), which may cause the autofocus retrigger operation 400 to determine that the camera is out of focus (e.g., when a window has been found to be out-of-bounds)—and unnecessarily adjust the position of the camera lens. Additionally, noise may also improperly cause the autofocus retrigger operation 400 to determine that the camera is in focus (e.g., when a window has been found to be in-bounds)—and fail to adjust the position of the camera's lens.

Figure 5B:
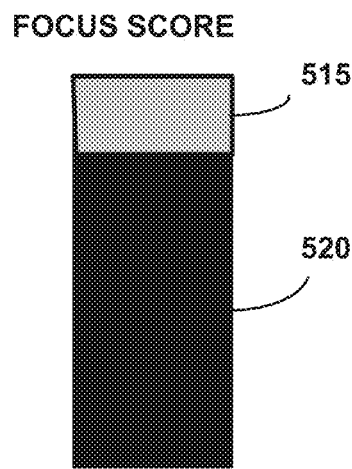
FIGS. 5B-5C illustrate sample focus scores having different noise ratios in accordance with one embodiment.
Figure 5C:
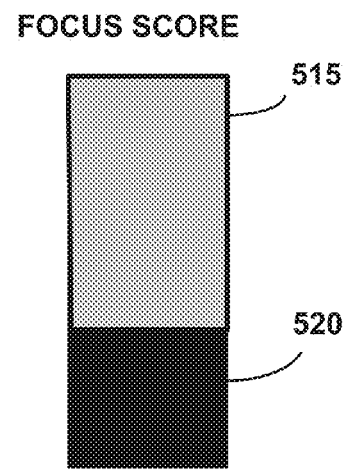

Referring to the example focus score in FIG. 5B, a maximum contrast amount 520 is shown (i.e., the amount of the focus score amount based on the maximum contrast detected by a window) together with an amount of associated noise 515. As illustrated in FIG. 5C, the noise 515 portion of the focus score may be substantially greater than the maximum contrast amount 520. Although the maximum focus amount 520 and an amount of noise 515 may be included in a window's focus score, the more noise contributing to the window's focus score, the more likely the autofocus retrigger operation 400 will improperly adjust, or fail to adjust the camera's lens.

Figure 6A:
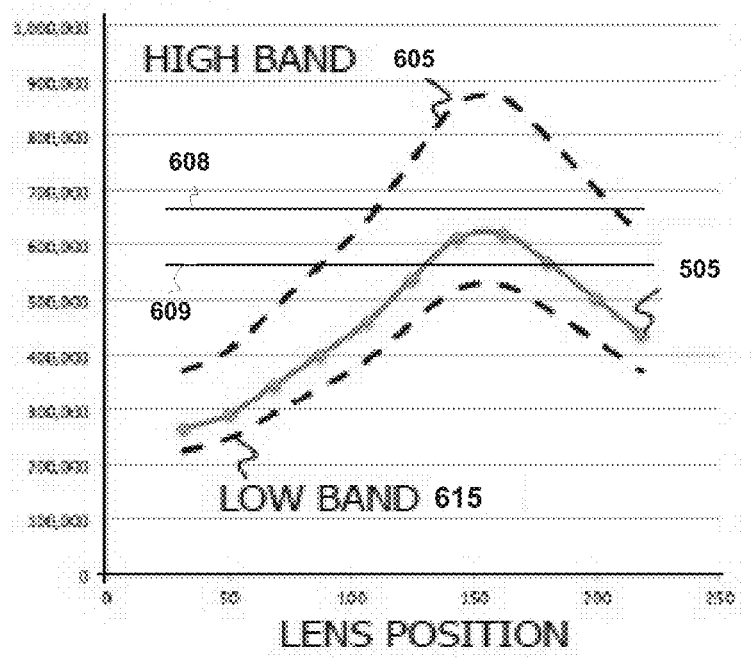
FIGS. 6A-6B, illustrate focus scores in relation to focus bands, in accordance with different embodiments.
Figure 6B:
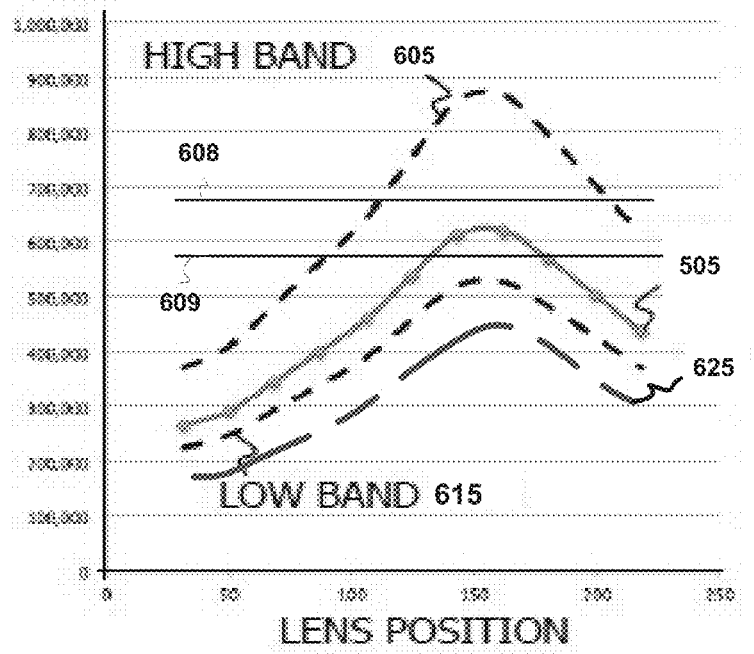

In one example, referring to FIGS. 6A-6B, a window's focus scores in relation to its respective high and low focus bands are illustrated. In this embodiment, the high and low focus bands (605 and 615) represent boundaries for a window's focus scores and may be set and used for monitoring purposes. In another embodiment, as shown with reference to in-focus bands 608 and 609, the focus bands may be constant over the lens position. In either case, the width of the focus bands may be affected by the noise in a window's focus score. For example, if you set up the focus bands as having a width of +/−20% of the peak of a window's focus score, the focus band (i.e., the high and low bands) will be wider as noise is added (e.g., 40% of a band's width may result from noise).

In one embodiment the, focus bands may be determined based on an initial captured image window's peak focus score. As a result, the noise within that window's focus score may not affect the position of the initial window's focus score relative to the window's set focus bands. In another embodiment, because removing noise from an initial image window's focus score, before setting a window's focus band, will make refocusing a camera's lens more consistent, the initial image's focus score may be first corrected before setting the focus bands (605 and 615) or (608 and 609).

During autofocus retrigger operation (400) however, additional images having one or more autofocus windows may be captured (block 425) and evaluated (block 430) with respect to the focus bands determined based on the previously captured initial image (block 415). In this embodiment, if the focus scores of the additionally captured images fall outside of the set focus bands (as described above), an autofocus retrigger operation may be initiated and the camera's lens may be refocused. In this embodiment, low focus band values between 0.5 to 0.95 of a corresponding window's focus scores, and high focus band values between 1.1 to 1.5 of a corresponding window's focus scores have been found useful.

Referring now to the illustration in FIG. 6A, one of the additional window's focus scores over a given set of lens positions are represented as a focus graph 505. However, because the window's focus graph 505 is not outside of the focus bands (605 and 615) or (608 and 609), an out-of-bounds condition is not shown to exist (i.e., the "NO" path through block 435). As a result, the retrigger operation 400 will not retrigger an autofocus operation.

However, the amount of noise within an additional window's focus score may impact the position of the additional window's focus graph 505 relative to focus bands (605 and 615) or (608 and 609). For example, referring to FIG. 6A, the amount of noise 515 (not shown) contributing to the focus scores of the additional window's focus graph 505 may enable the focus graph 505 to remain inside of the focus bands (i.e., the "YES" path through block 535). Thus, even if the camera needs refocusing based on the maximum contrast amount 520 (not shown), the retrigger operation 400 will not be initiated.

In another embodiment however, referring to FIG. 6B, an additional window's focus graph 505 may have correctly remained inside of the focus bands (605 and 615) or (608 and 609), but because of the amount of noise 515 (not shown) within the additional window's focus score, the additional window's focus graph 505 may fall outside of the additional window's focus bands (i.e., the "NO" path through block 435). As a result, the retrigger operation 400 may improperly be initiated. For example, as illustrated in FIG. 6B, based on the amount of noise 515 present in the window's focus score, the additional window's focus graph 505 has fallen to a lower position relative to the focus bands (as shown by illustrative focus graph 625). As a result, because the lower positioned focus graph 625 is outside of focus bands (605 and 615) or (608 and 609), the retrigger operation 400 may determine that an out of bounds condition has occurred (block 435). Accordingly, even though a camera may be in focus, based on the maximum contrast amount 520 (not shown), the autofocus retrigger operation 400 will be initiated (i.e., the "YES" path through block 435).

The description above has been directed to describing the issues related to an amount of noise within a window's focus score, determined by autofocus operation 300. The next section of the disclosure will focus on correcting the autofocus operation 300 of a camera by subtracting noise from the camera's focus scores based on an empirical evaluation of image metadata rather than measuring noise directly (e.g., through image analysis techniques).

As described below, many different functions of a camera can generate noise. This noise may be represented and reported as all or part of the metadata of an image. At least one attribute of camera functionality that may be a factor in generating noise is the gain of the camera system (i.e., the camera gain). For example, camera gain may include an analog and/or digital gain of the camera. In another example, a contributing factor of noise may be associated with the white balance gain of the camera. In this example, adjusting a camera's white balance gain may contribute an amount of gain for each color channel measured by the camera (i.e., red, green, and blue color channels). Noise may be associated with this added gain.

In another embodiment however, noise may be a byproduct of the lens shading gain added as a result of the average intensity or (i.e., "light level") measured by the camera's sensor. For example, if light is measured at the edge of a camera's sensor, the light measured at that sensor position may not have the same intensity as the same amount of light measured at the center of the camera's sensor. As a result, lens shading may add additional noise by applying a non-uniform gain for each color channel (Bayer R, GR, GB, and B) to correct for illumination differences and lens irregularities. In one embodiment, the camera hardware may report the measured lens shading gain for each location of the camera's sensor.

Other noise generation factors may include, without limit, a camera's shutter speed, focal length, aperture setting, ISO speed (i.e., absolute sensitivity to light), surrounding temperature and pressure conditions, type and/or size of the image sensor 205, type and/or size of the camera lens 215, the type of color channel detection, and the exposure setting of the camera.

Figure 7:
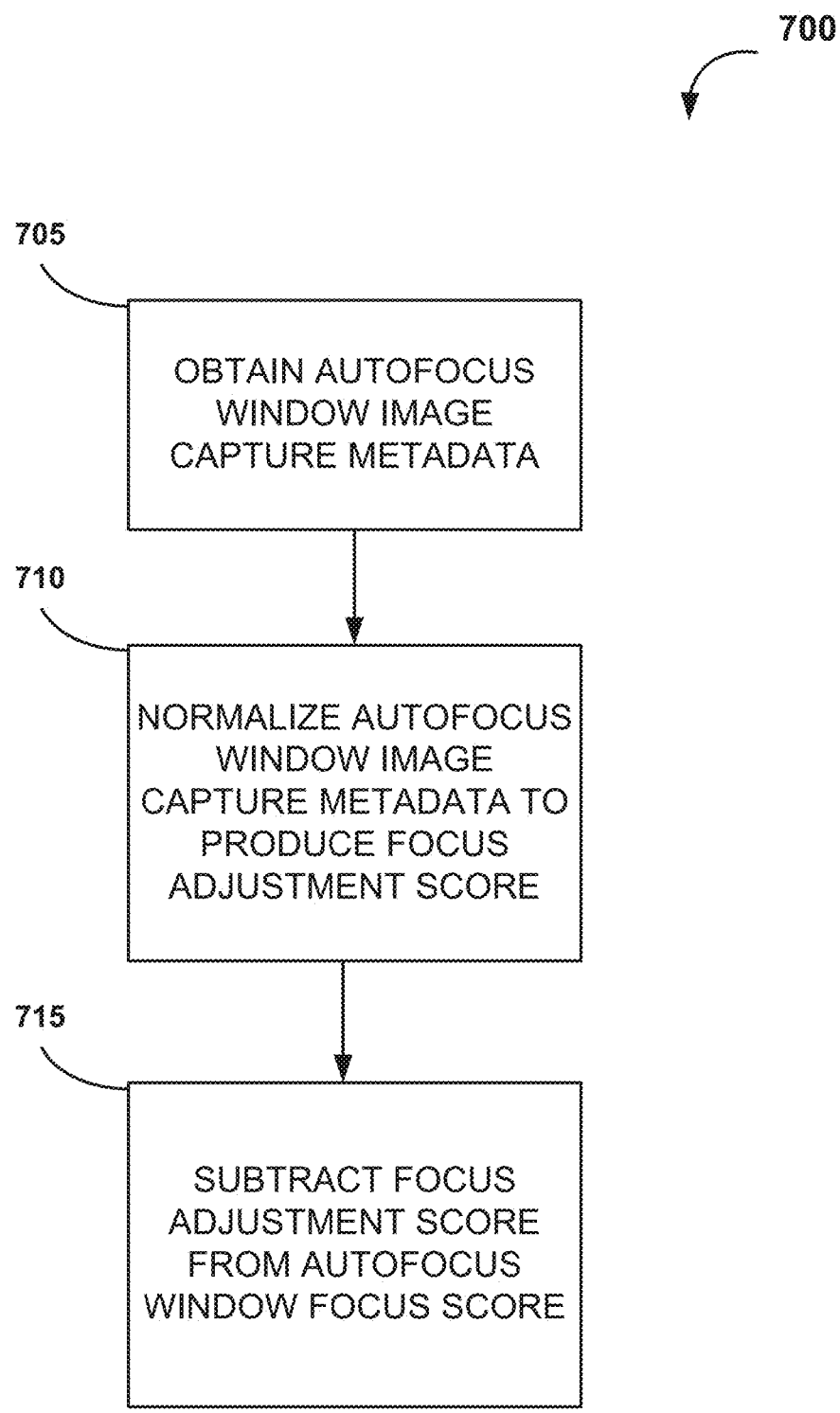
FIG. 7 shows, in block diagram form, a noise correction operation in accordance with one embodiment.

FIG. 7 shows, in flowchart form, a noise correction operation 700 in accordance with one embodiment. As described below, the noise correction operation 700 of FIG. 7 may be used to correct an autofocus window's focus scores determined during, for example, autofocus retrigger operation 400. This will enable the autofocus system to more accurately determine when to initiate an autofocus retrigger operation 400.

In one embodiment of the noise correction operation 700, the image capture metadata for an autofocus window is obtained (block 705). This image capture metadata may be reported by the camera system, and may include the data and parameters that were used during image capture operation. The metadata may be reported during autofocus operation 300 or retrigger operation 400 and may be evaluated to produce a number that is empirically determined to be representative of the noise portion of a window's focus score. The image capture metadata may be further converted or normalized in order to produce a focus adjustment score (block 710).

Empirically, it has been determined that for one camera/image capture device the general relationship between various device and image capture parameters and the focus adjustment score (FAS) may be given, in functional terms, as:

$$\text{FAS} = f(I, G_T, G_L, B, S) + \text{offset}, \quad \text{EQ. 1}$$

where $f(\ )$ represents a general functional relationship, I represents intensity, $G_T$ represents the combined gain, $G_L$, represents the combined lens shading gain (may not be uniform over the sensor area), B represents a scaling factor due to binning (i.e., if the sensor in a binning mode or not), S represents a scaling factor due to the image capture device running in a resized mode (e.g., downscaling to 1080p or 720p for video), and offset represents a fixed value resulting from data fitting operations (e.g., least squares minimization). More specifically, the empirical analysis of a given camera shows that the focus adjustment score may be given as:

$$\text{FAS} = f(I+b_I)^{\alpha_I} \times f(G_T+b_{GT})^{\alpha_{GT}} \times f(G_L+b_{GL})^{\alpha_{GL}} \times f(B+b_B)^{\alpha_B} \times f(S+b_S)^{\alpha_S} + \text{offset}, \quad \text{EQ. 2}$$

where $b_{[\ ]}$ represents a bias constant for the corresponding term and $\alpha_{[\ ]}$ represents a power constant for the corresponding term. As illustrated, the focus adjustment score in accordance with the embodiment of EQ. 2 represents a weighted (or biased) product of image capture metadata values, which is indicative of an autofocus window's noise. The normalization process is necessary so that the image capture metadata for a focus window, and the focus window's corresponding focus score may be compared. This will allow the noise portion of the window's corresponding focus score to be corrected by subtracting the focus adjustment score from the autofocus window's corresponding focus score. In one embodiment, normalizing image capture metadata may be similar to the process of determining focus scores as described with reference to (block 315) of FIG. 3. In another embodiment, the normalization process may include taking a weighted sum (or average) of the image capture metadata.

After the image capture metadata has been normalized to produce a focus adjustment score, a corrected focus score may be determined for the autofocus window based on the autofocus window's initial focus scores, and the autofocus window's focus adjustment scores. In one embodiment, the focus adjustment score may be subtracted from the autofocus window's one or more focus scores (block 715). This will effectively correct the autofocus window's focus scores by removing that component attributable to the noise from the autofocus window's focus scores as described above.

The embodiments described above are only illustrative, as other attributes of camera functionality may also contribute to the amount of noise present within a window's focus score. However, after the noise associated with an autofocus window has been normalized and removed, the autofocus retrigger operation 400 will be able to more accurately determine whether a retrigger operation 400 should be initiated, thereby making the camera's autofocus operation 300 more robust while also helping to save power.

Referring to FIG. 8, a simplified functional block diagram of illustrative electronic device 800 is shown according to one embodiment. Electronic device 800 could be, for example, a mobile telephone, personal media device, portable camera, or a tablet, notebook or desktop computer system. As shown, electronic device 800 may include processor 825, display 840, user interface 810, graphics hardware 845, device sensors 835 (e.g., proximity sensor/ambient light sensor, accelerometer and/or gyroscope), microphone 815, audio codec(s) 820, speaker(s) 805, communications circuitry 850, image capture circuit or unit 830, video codec(s) 855, memory 860, storage 865, and communications bus 870.

Processor 825 may execute instructions necessary to carry out or control the operation of many functions performed by device 800 (e.g., such as the generation and/or processing of images in accordance with FIGS. 3, 4 and 7). Processor 825 may, for instance, drive display 840 and receive user input from user interface 810. User interface 810 can take a variety of forms, such as a button, keypad, dial, a click wheel, keyboard, display screen and/or a touch screen. Processor 825 may be a system-on-chip such as those found in mobile devices and include one or more dedicated graphics processing units (GPUs). Processor 825 may be based on reduced instruction-set computer (RISC) or complex instruction-set computer (CISC) architectures or any other suitable architecture and may include one or more processing cores. Graphics hardware 845 may be special purpose computational hardware for processing graphics and/or assisting processor 825 in perform computational tasks. In one embodiment, graphics hardware 845 may include one or more programmable graphics processing units (GPUs).

Image capture circuitry 830 may capture still and video images that may be processed to generate images. Output from image capture circuitry 830 may be processed, at least in part, by video codec(s) 855 and/or processor 825 and/or graphics hardware 845, and/or a dedicated image processing unit incorporated within circuitry 830. Images so captured may be stored in memory 860 and/or storage 865. Memory 860 may include one or more different types of media used by processor 825, graphics hardware 845, and image capture circuitry 830 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 825 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In one or more embodiments, one or more of the steps may be omitted, repeated, and/or performed in a different order. Accordingly, the specific arrangement of steps shown in FIG. 3, 4, or 7 should not be construed as limiting the scope of the technique. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An autofocus correction method for a digital image capture device, comprising:
   capturing an image of a scene, the image including an autofocus window;
   obtaining an initial focus score for the autofocus window;
   obtaining image capture metadata for the autofocus window;
   determining a focus adjustment score based directly on a combination of the autofocus window's image capture metadata, wherein the focus adjustment score is indicative of the autofocus window's noise; and
   determining a corrected focus score based on the auto focus window's initial focus score and the auto focus window's determined focus adjustment score.

2. The method of claim 1, wherein obtaining image capture metadata comprises obtaining two or more of white balance gain, lens shading correction gain, light level, camera gain, focal length, autofocus window position, shutter speed, aperture setting, ISO speed, image capture temperature, image capture pressure, type of lens, size of lens, color channel detection type, and exposure setting.

3. The method of claim 1, wherein:
   the captured image comprises a plurality of autofocus windows;
   obtaining an initial focus score comprises obtaining an initial focus score for each of the plurality of autofocus windows;
   obtaining image capture metadata comprises obtaining image capture metadata for each of the plurality of autofocus windows;
   determining a focus adjustment score comprises determining a focus adjustment score for each of the plurality of autofocus windows, wherein each focus adjustment score is based directly on a combination of that autofocus window's image capture metadata, wherein each focus adjustment score is indicative of the corresponding autofocus window's noise; and
   determining a corrected focus score comprises determining a corrected focus score for each of the plurality of autofocus windows, wherein each corrected focus score is based on each autofocus window's initial focus score and determined focus adjustment score.

4. The method of claim 1, wherein determining a focus adjustment score based directly on a combination of the autofocus window's image capture metadata, comprises generating a weighted average of the autofocus window's image capture metadata.

5. The method of claim 1, further comprising:
capturing a plurality of additional images of the scene, wherein each additional image is captured at a different lens position;
obtaining an initial focus score for each of the additional images;
obtaining image capture metadata for each of the initial focus scores;
determining a focus adjustment score for each of the initial focus scores based directly on a combination of each image's image capture metadata; and
determining a corrected focus score for each of the additional images based on each additional image's initial focus score and corresponding focus adjustment score.

6. A digital device, comprising:
a lens assembly;
one or more imaging sensors optically coupled to the lens assembly;
memory operatively coupled to the one or more imaging sensors;
a display operatively coupled to the memory;
one or more processors operatively coupled to the lens assembly, imaging sensors, display, and memory and configured to execute instructions stored in the memory to cause the one or more processors to—
capture an image of a scene, the image including an autofocus window;
obtain an initial focus score for the autofocus window;
obtain image capture metadata for the autofocus window;
determine a focus adjustment score based directly on a combination of the autofocus window's image capture metadata, wherein the focus adjustment score is indicative of the autofocus window's noise; and
determine a corrected focus score based on the auto focus window's initial focus score and the auto focus window's determined focus adjustment score.

7. The digital device of claim 6, wherein the instructions to cause the one or more processors to obtain image capture metadata comprise instructions to cause the one or more processors to obtain two or more of white balance gain, lens shading correction gain, light level, camera gain, focal length, autofocus window position, shutter speed, aperture setting, ISO speed, image capture temperature, image capture pressure, type of lens, size of lens, color channel detection type, and exposure setting.

8. The digital device of claim 6, wherein:
the captured image comprises a plurality of autofocus windows; and the instructions to cause the one or more processors to—
obtain an initial focus score further comprise instructions to cause the one or more processors to obtain an initial focus score for each of the plurality of autofocus windows;
obtain image capture metadata further comprise instructions to cause the one or more processors to obtain image capture metadata for each of the plurality of autofocus windows;
determine a focus adjustment score further comprise instructions to cause the one or more processors to determine a focus adjustment score for each of the plurality of autofocus windows, wherein each focus adjustment score is based directly on a combination of that autofocus window's image capture metadata, wherein each focus adjustment score is indicative of the corresponding autofocus window's noise; and
determine a corrected focus score further comprise instructions to cause the one or more processors to determine a corrected focus score for each of the plurality of autofocus windows, wherein each corrected focus score is based on each autofocus window's initial focus score and determined focus adjustment score.

9. The digital device of claim 6, wherein the instructions to cause the one or more processors to determine a focus adjustment score based directly on a combination of the autofocus window's image capture metadata, further comprise instructions to cause the one or more processors to generate a weighted average of the autofocus window's image capture metadata.

10. The digital device of claim 6, wherein the instructions to cause the one or more processors to determine a focus adjustment score based directly on a combination of the autofocus window's image capture metadata, further comprise instructions to cause the one or more processors to generate a weighted product of the autofocus window's image capture metadata.

11. The digital device of claim 6, further comprising instructions to cause the one or more processors to—
capture a plurality of additional images of the scene, wherein each additional image is captured at a different lens position;
obtain an initial focus score for each of the additional images;
obtain image capture metadata for each of the initial focus scores;
determine a focus adjustment score for each of the initial focus scores based directly on a combination of each image's image capture metadata; and
determine a corrected focus score for each of the additional images based on each additional image's initial focus score and corresponding focus adjustment score.

12. The digital device of claim 11, further comprising instructions to cause the one or more processors to select an image capture lens position based on the corrected focus scores.

13. The digital device of claim 12, further comprising instructions to cause the one or more processors to capture another image of the scene at the selected image capture lens position.

14. The digital device of claim 12, wherein the instructions to cause the one or more processors to determine a focus adjustment score for each of the initial focus scores comprise instructions to cause the one or more processors to generate, for each image, a weighted average of the autofocus window's image capture metadata.

15. A programmable storage device, having instructions stored within that when executed by one or more processors cause the one or more processors to—
capture an image of a scene, the image including an autofocus window;
obtain an initial focus score for the autofocus window;
obtain image capture metadata for the autofocus window;
determine a focus adjustment score based directly on a combination of the autofocus window's image capture metadata, wherein the focus adjustment score is indicative of the autofocus window's noise; and determine a corrected focus score based on the auto focus window's initial focus score and the auto focus window's determined focus adjustment score.

16. The programmable storage device of claim 15, wherein the instructions to cause the one or more processors to obtain image capture metadata comprise instructions to cause the one or more processors to obtain two or more of white balance gain, lens shading correction gain, light level, camera gain, focal length, autofocus window position, shutter speed, aperture setting, ISO speed, image capture temperature, image capture pressure, type of lens, size of lens, color channel detection type, and exposure setting.

17. The programmable storage device of claim 15, wherein:
the captured image comprises a plurality of autofocus windows; and the instructions to cause the one or more processors to—
obtain an initial focus score further comprise instructions to cause the one or more processors to obtain an initial focus score for each of the plurality of autofocus windows;
obtain image capture metadata further comprise instructions to cause the one or more processors to obtain image capture metadata for each of the plurality of autofocus windows;
determine a focus adjustment score further comprise instructions to cause the one or more processors to determine a focus adjustment score for each of the plurality of autofocus windows, wherein each focus adjustment score is based directly on a combination of that autofocus window's image capture metadata, wherein each focus adjustment score is indicative of the corresponding autofocus window's noise; and
determine a corrected focus score further comprise instructions to cause the one or more processors to determine a corrected focus score for each of the plurality of autofocus windows, wherein each corrected focus score is based on each autofocus window's initial focus score and determined focus adjustment score.

18. The programmable storage device of claim 15, wherein the instructions to cause the one or more processors to determine a focus adjustment score based directly on a combination of the autofocus window's image capture metadata, further comprise instructions to cause the one or more processors to generate a weighted average of the autofocus window's image capture metadata.

19. The programmable storage device of claim 18, wherein the instructions to cause the one or more processors to determine a focus adjustment score based directly on a combination of the autofocus window's image capture metadata, further comprise instructions to cause the one or more processors to generate a weighted product of the autofocus window's image capture metadata.

20. The programmable storage device of claim 15, further comprising instructions to cause the one or more processors to—
capture a plurality of additional images of the scene, wherein each additional image is captured at a different lens position;
obtain an initial focus score for each of the additional images;
obtain image capture metadata for each of the initial focus scores;
determine a focus adjustment score for each of the initial focus scores based directly on a combination of each image's image capture metadata; and
determine a corrected focus score for each of the additional images based on each additional image's initial focus score and corresponding focus adjustment score.

* * * * *